United States Patent [19]

Vocke et al.

[11] Patent Number: 4,926,843

[45] Date of Patent: May 22, 1990

[54] COOKING VESSEL

[75] Inventors: Henning L. Vocke, Helsingfors; Pauli Saarenko, Järvenpää, both of Finland

[73] Assignee: Oy Alu AB, Jarvenpaa, Finland

[21] Appl. No.: 362,823

[22] Filed: Jun. 6, 1989

Related U.S. Application Data

[63] Continuation of Ser. No. 296,335, Jan. 10, 1989, abandoned, which is a continuation of Ser. No. 35,727, Apr. 8, 1987, abandoned, which is a continuation of Ser. No. 782,706, Oct. 1, 1985, abandoned.

[30] Foreign Application Priority Data

Nov. 2, 1984 [FI] Finland .................................. 844308
Jan. 21, 1985 [FI] Finland .................................. 850259

[51] Int. Cl.$^5$ .............................................. A47J 27/00
[52] U.S. Cl. ..................................... 126/390; 99/422; 220/455; 29/527.4; 72/46
[58] Field of Search ................. 126/390, 373; 99/422, 99/447; 220/454, 455; 29/527.2, 527.4; 51/326, 283 R; 72/46, 340, 703

[56] References Cited

U.S. PATENT DOCUMENTS

| 2,315,475 | 3/1943 | Cobb et al. ........................ 126/390 |
| 3,133,341 | 5/1964 | Marien ........................... 29/527.4 X |
| 3,593,702 | 7/1971 | Zigomalas ....................... 220/455 X |
| 4,508,100 | 4/1985 | Deville ............................... 126/390 |

FOREIGN PATENT DOCUMENTS 2828021 of 1980 Fed. Rep. of Germany .
8123629 of 1982 Fed. Rep. of Germany .

Primary Examiner—Randall L. Green
Attorney, Agent, or Firm—Ladas & Parry

[57] ABSTRACT

The bottom surface of a cooking vessel (1) is provided with a plurality of concentric grooves (3) by form rolling. The grooves are then provided with a coating (5) to absorb radiation heat from a hotplate. Thus in use the grooves absorb radiation heat while the annular surfaces (4), between the grooves which are in contact with the hot plate absorb contact heat. The resulting vessel also has a very strong construction since the annular surfaces between the grooves act as reinforcing ribs.

4 Claims, 2 Drawing Sheets

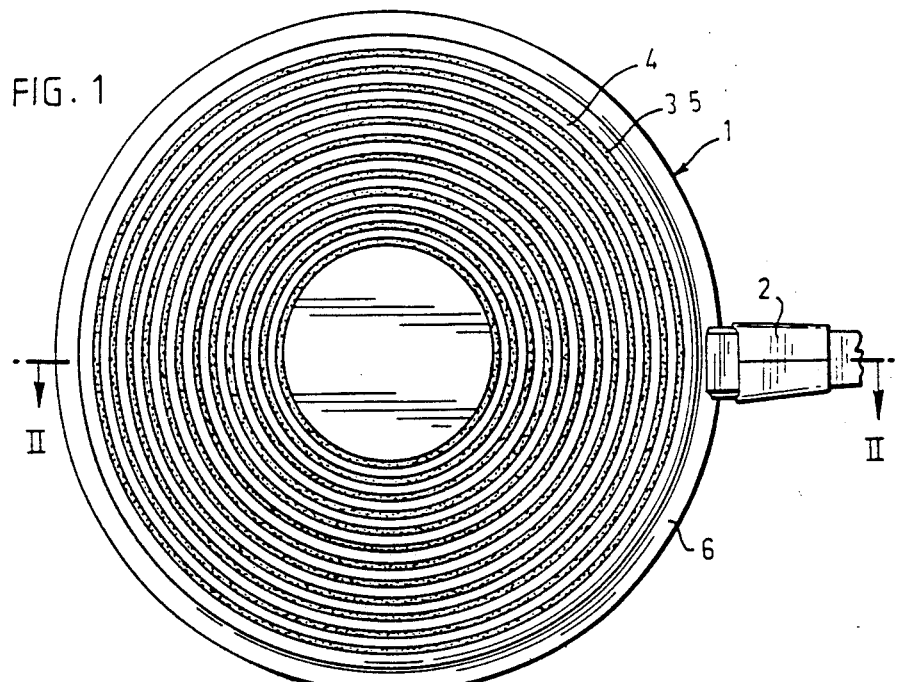
FIG. 1
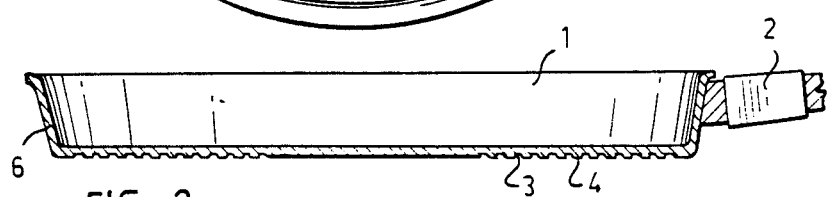
FIG. 2
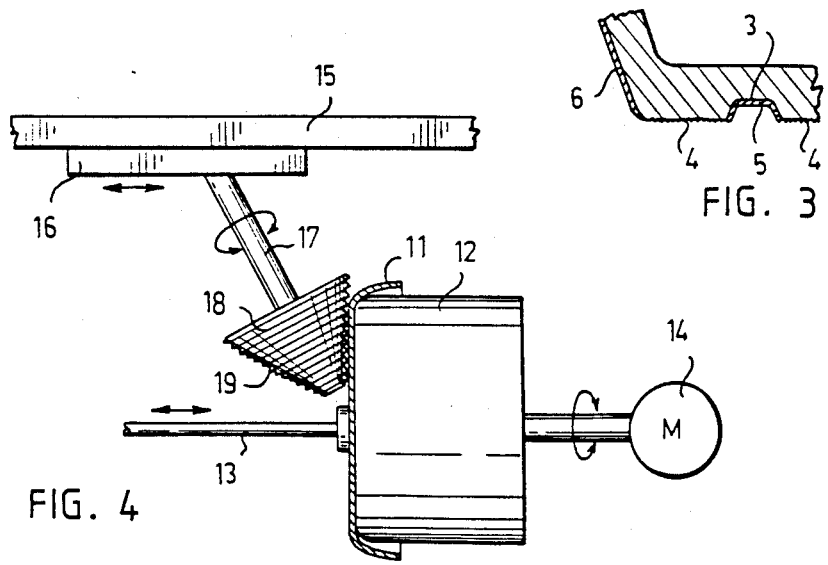
FIG. 3
FIG. 4

COOKING VESSEL

This is a continuation of application Ser. No. 07/296,335 filed on Jan. 10, 1989 (now abandoned) which is a continuation of Ser. No.: 07/035,727 filed Apr. 8, 1987 (now abandoned) which is a continuation of Ser. No.: 06/782,706 filed Oct. 1, 1985 (now abandoned).

The present invention relates to the bottom surface of a cooking vessel. The invention is also concerned with a method of and an apparatus for manufacturing of the bottom surface of a cooking vessel.

Cooking vessels, such as kettles and frying pans, are usually manufactured of aluminium. In order that the cooking vessel be provided with a bottom as flat as possible, whereby the whole surface of the bottom makes contact with the hotplate of a stove, it is known to turn the bottom in a lathe so as to provide it with a spiral-shaped, shallow groove covering the entire bottom.

A disadvantage of this kind of bottom is that it is capable of absorbing only such heat energy from the hotplate which is transferred through direct contact between the hotplate and the cooking vessel, i.e. contact heat. The radiation heat transferred from the hotplate to the bottom portions of the spiral-shaped groove is reflected away from the glossy aluminium surface, thus contributing less to the heating of the cooking vessel. In addition, as there is a tendency to make the bottoms of cooking vessels as thin as possible so as to save material, it is not unusual that the flat shape of the bottom is deformed after a long use, which results in a radical drop in the transmission of heat to the cooking vessel through contact.

It is also known to fit a metal ring on the bottom of the cooking vessel, whereby the central bottom portion inside said ring absorbs radiation heat only and the bottom portion under the ring absorbs contact heat and, as a result of the deformation of the ring when heated, also radiation heat.

Production costs for such a bottom are very high and the heat transmission from the hotplate to the cooking vessel is poor.

The object of the present invention is to provide a bottom surface for a cooking vessel, which provides a better and more even heat transmission as well as a greater stability of the bottom in long-term use than the previously known bottom constructions.

Viewed from one aspect the present invention provides a cooking vessel whose bottom surface is formed with concentric ring-shaped grooves which are provided with a coating which increases the capacity of the surfaces for absorbing radiation heat.

Transmission of radiation heat to the cooking vessel is especially efficient, if the coating of the grooves is dark, preferably black, and has a mat surface. Said coating can preferably consist of a layer of the same enamel as is used for coating the outer side surfaces of the vessel.

Suitable dimensions for the grooves of a cooking vessel of normal size are a width of 4 to 7 mm, preferably 6 mm, and a depth of 0.5 to 2 mm. The ring-shaped surfaces between the grooves are preferably glossy and they can have a width of 3 to 6 mm, preferably 4 mm.

It is known from German Offenlegungsschrift 2 143 260 to replace the cutting machining described above with plane rolling carried out by means of two conical roller bodies which are pressed against the outer surfaces of the bottom with great force. This treating, however, does not prevent later formation of irregularities on the bottom of the cooking vessel and, further, said rolling requires great forces to be applied.

A further object of the present invention is to provide a method of forming the bottom surface of a cooking vessel, by means of which a bottom surface is obtained which maintains the even shape thereof even after a long-term use and which, besides, can extensively utilize both the contact heat and the radiation heat from the hotplate.

Viewed from a second aspect the invention provides a method of forming the bottom surface of a cooking vessel, wherein concentric grooves are formed in the bottom surface by means of form rolling.

In accordance with a preferred embodiment of the method according to the invention, the absorption of radiation heat can be improved by providing the grooved surface with a surface layer of heat-absorbing material, whereafter said layer is removed from the bottom surface in the portions positioned between the grooves. In this way the grooves are provided with a surface which guarantees for the grooves an optimum absorption of the radiation heat from the cooking plate, whereas the portions between the grooves are glossy, thus enabling the best possible contact with the cooking plate.

If the heat-absorbing material is fluid, e.g. enamel, it can be applied to the bottom surface by spraying and removed from the portions between the grooves by turning in a lathe.

Viewed from another aspect the invention provides apparatus for machining the bottom surface of a cooking vessel, said apparatus comprising at least one supporting device making contact with the inner surface of the bottom of the cooking vessel, a shaping device provided with at least one conical shaping body, the surface of which can be brought into contact with the outer surface of the bottom of the cooking vessel along a radial line, and means for rotation of the bottom of the cooking vessel and the shaping body with respect to each other around the centre axis of the bottom of the cooking vessel, the surface of said shaping body being provided with parallel ridges extending in the direction of the periphery of the body.

A preferred embodiment of the invention will now be described by way of example and with reference to the accompanying drawings, in which:

FIG. 1 is a plan view of a bottom of a frying pan according to the invention,

FIG. 2 is a cross-section along the line II—II in FIG. 1,

FIG. 3 is an enlarged view of a detail of FIG. 2,

FIG. 4 is a side view of an apparatus for machining of the bottom surface of a cooking vessel

Figure 5:
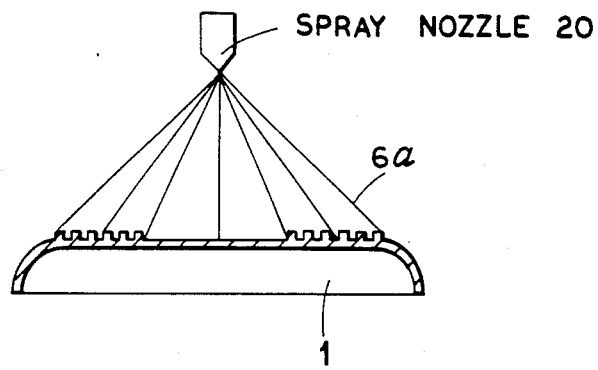
FIG. 5 is a schematic illustration, partly in section, of a spraying step in a process of making a cooking vessel.

FIGS. 1 and 2 illustrate a frying pan 1 provided with a handle 2. The inside of the bottom of the frying pan is planar, whereas the outside thereof, which is intended to make contact with the hotplate, is provided with a plurality of concentric grooves 3 spaced apart by glossy ring-shaped surfaces 4. The surfaces of the grooves are covered with a coating 5 which has a high capacity for absorbing radiation heat. The outer side surfaces of the frying pan 1 are provided with a layer 6 of enamel.

Though the width of the grooves 3 can vary considerably, a width of 4 to 7 mm, preferably 6 mm, has proved advantageous, whereas the surfaces 4 can be slightly narrower, e.g. have a width of 3 to 6 mm, preferably 4 mm. The grooves 3 preferably have a depth of 0.5 to 2 mm. In FIG. 3 the shallow turning grooves formed in the glossy surfaces 4 can also be seen.

The coating 5 preferably consists of the same enamel as used in forming the layer 6 on the outside of the frying pan, whereby the enamel may be dark, preferably black. The coating 5 can, however, consist of some other material with a high heat-absorbing capacity. It is also advantageous if the coating has a mat surface.

The cooking vessel may be manufactured of such materials as aluminium, copper, brass and iron. Instead of a frying pan, the cooking vessel can be e.g. a kettle.

When using such a cooking vessel, the vessel is placed on a hotplate, whereby contact heat is transferred from the hotplate to the surfaces 4 through conduction. The heat transferred from the hotplate in the form of radiation, so called radiation heat, is, on the contrary, absorbed mainly by the coating 5, wherefrom it is conducted to the cooking vessel proper. In this way both the contact and the radiation heat of the hotplate can be utilized, which results in saving of energy in comparison with the previously known cooking vessels. On account of the alternation of the surfaces absorbing contact heat and radiation heat, an even heating of the cooking vessel is also obtained.

The term "coating" is also intended to mean a surface layer of the material of the cooking vessel which is exposed to such a treating that the surface layer is provided with the required absorbing properties. The groove depth can vary so that different grooves have different depths. The centre of the bottom advantageously has the same depth as the grooves.

FIG. 4 illustrates an apparatus for machining of the bottom surface of a cooking vessel.

A blank 11 for a frying pan of aluminium is illustrated in a vertical section in the Figure, which blank is clamped between a support 12 making contact with the inside of the bottom and a press piston 13 making contact with the outside of the bottom. The press piston is of a considerably smaller diameter than the support, making contact with a limited area of the bottom of the frying pan in the center thereof. The support 12 is connected to a motor 14 by means of a shaft, whereby said support, and thus also the blank 11, can be rotated around the centre axis thereof by means of said motor.

A rail 15 is secured adjacent said elements and a slide 16 is mounted on said rail. An axle 17 is rotatably mounted on the slide 16, whereby the free end thereof supports a shaping body 18.

The shaping body 18 is conical and the surface thereof is provided with parallel ridges 19 extending in the direction of the periphery. The shaping body can be brought into contact with the bottom surface of the blank 11 along a radial contact line, because one contour of the surface of the shaping body is parallel with the bottom surface of the blank.

The blank 11 is clamped between the support 12 and the press piston 13, whereafter the shaping body 18 is displaced, in the Figure to the right, so as to make contact with the bottom surface of the blank. When the blank is thereafter rotated around its center axis, the ridges 19 in the surface of the shaping body cause concentric grooves to be formed on the bottom surface of the blank, because the shaping body 18 is pressed against the blank with a certain force.

After a few rotations of the blank, the grooves obtain a sufficient depth and the blank can be removed from the apparatus.

Figure 6:
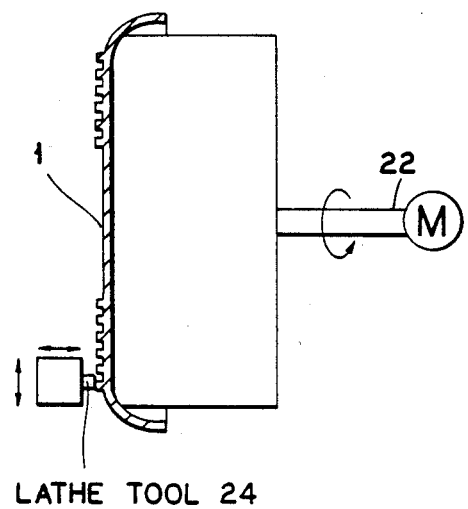
FIG. 6 is a schematic illustration, partly in section, of a lathing step in the process.

After the bottom has been shaped, it is sprayed from sprayer or nozzle 20 of FIG. 5, for example, with a material 6a of high capacity for absorbing radiation heat, such as black enamel, and, finally, the bottom is turned in a lathe 22 so that said enamel layer is removed from the bottom portions located between the grooves with a tool 24, as shown in FIG. 6. The bottom is thereby provided with an attractive appearance in the form of black and glossy rings.

If the cooking vessel is made of a material of satisfactory heat-absorbing properties, it may not be necessary to apply a separate coating layer. Instead of enamel, it is, of course, possible to use other, preferably dark materials which reflect radiation as little as possible. If desired, the apparatus can be provided with two or more shaping bodies 18 and instead of the blank the shaping body can be rotated around the center axis of the blank.

Thus it will be seen that, at least in preferred forms of the invention, the presence of concentric grooves with a heat-absorbing coating on the bottom of the cooking vessel enables a heat-absorbing surface to be obtained which is larger than that of known constructions. The bottom surface of the cooking vessel also has a greater stiffness than the known constructions as the thicker, ring-shaped bottom portions between the grooves act as reinforcing ribs. At the same time, the heat-absorbing coating of the grooves enables an excellent heat-transmission from the hotplate to the cooking vessel on account of that the radiation heat of the hotplate is absorbed by the coating of the grooves and the contact by the glossy surfaces of the ribs between the grooves. The heat transmission is not only made better but also very even due to the fact that surfaces absorbing contact heat alternate with surfaces absorbing radiation heat. A cooking vessel is provided with a bottom surface formed with concentric annular surfaces which, in use, face a hotplate in at least two planes.

Two advantages are achieved by providing the bottom surface with concentric grooves by means of form rolling. Firstly, the raised bottom portions between the grooves act as reinforcing ribs which help to maintain the flat shape of the bottom. Secondly, no material is wasted during the treating, because the rolling operation only provides a redistribution of the material, by virtue of which the starting material can be thinner than that required for making the bottom flat by turning. As a matter of fact, a bottom is achieved which is thicker than the starting material, because the material is displaced from the grooves to the portions therebetween during the shaping operation, which portions are thereby increased in height. This kind of shaping of the bottom also provides alternating ring-shaped zones on the bottom, which by turns are in contact with the hotplate and at a short distance therefrom. The portions making contact with the hotplate absorb contact heat from the hotplate, whereas the portions located at a distance from the hotplate absorb radiation heat from the plate.

We claim:
1. A method of forming the bottom surface of a cooking vessel, the method comprising:
providing a cooking vessel having a bottom surface;

roll forming spaced, concentric grooves having widths of 4 to 7 mm and depths of 0.5 to 2 mm into the bottom surface of the cooking vessel, the spaces between adjacent ones of the grooves thereby being protrusions from the adjacent grooves;

providing layers of a heat-absorbing material only in the respective grooves; and maintaining the heights of the layers from the grooves the layers are respectively in to less than that of the protrusions from the respective grooves comprises: supporting an inner surface of the cooking vessel that is opposite the bottom surface;

radially contacting the bottom surface with a conical shaping body having parallel ridges thereabout; and rotating the bottom surface of the cooking vessel and the conical shaping body while in contact, whereby to retain the grooves.

2. The method of claim 1, wherein providing the layers of heat-absorbing material comprises providing a layer of the heat-absorbing material all over the roll-formed bottom surface of the cooling vessel and removing the portions of the layer over the protrusions thereof.

3. A method according to claim 1, wherein the heat-absorbing material is applied to the bottom surface by spraying.

4. A method according to claim 1, wherein the heat-absorbing material layer is removed by turning in a lathe.

* * * * *